United States Patent
Lee et al.

(10) Patent No.: US 8,098,243 B2
(45) Date of Patent: Jan. 17, 2012

(54) METHOD AND APPARATUS FOR EFFICIENTLY HANDLING QUERY FOR 3D DISPLAY

(75) Inventors: Keechang Lee, Yongin-si (KR); Dokyoon Kim, Seongnam-si (KR); Jeonghwan Ahn, Suwon-si (KR); Seyoon Tak, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 757 days.

(21) Appl. No.: 11/525,899

(22) Filed: Sep. 25, 2006

(65) Prior Publication Data

US 2007/0083499 A1    Apr. 12, 2007

Related U.S. Application Data (60) Provisional application No. 60/719,561, filed on Sep. 23, 2005.

(30) Foreign Application Priority Data

Jan. 12, 2006  (KR) .................. 10-2006-0003560

(51) Int. Cl.
  *G06T 15/00* (2011.01)
  *G06T 17/00* (2006.01)
  *G06T 15/50* (2011.01)
(52) U.S. Cl. ................ 345/419; 345/424; 345/426
(58) Field of Classification Search .......... 345/419, 345/424, 426
See application file for complete search history.

(56) References Cited

U.S. PATENT DOCUMENTS

| | | | | |
|---|---|---|---|---|
| 5,414,801 A * | 5/1995 | Smith et al. | .............. | 345/419 |
| 5,572,634 A * | 11/1996 | Duluk, Jr. | .............. | 345/419 |
| 5,579,455 A * | 11/1996 | Greene et al. | .............. | 345/422 |
| 5,594,844 A * | 1/1997 | Sakai et al. | .............. | 345/427 |
| 5,920,660 A * | 7/1999 | Goto | .............. | 382/300 |
| 5,933,146 A * | 8/1999 | Wrigley | .............. | 345/420 |
| 5,999,187 A * | 12/1999 | Dehmlow et al. | .............. | 345/420 |
| 6,028,608 A * | 2/2000 | Jenkins | .............. | 345/619 |
| 6,057,847 A * | 5/2000 | Jenkins | .............. | 345/422 |
| 6,228,664 B1 * | 5/2001 | Bronson et al. | .............. | 438/14 |
| 6,300,965 B1 * | 10/2001 | Sowizral et al. | .............. | 345/622 |
| 6,326,964 B1 * | 12/2001 | Snyder et al. | .............. | 345/419 |
| 6,480,205 B1 * | 11/2002 | Greene et al. | .............. | 345/631 |
| 6,597,359 B1 * | 7/2003 | Lathrop | .............. | 345/440 |
| 6,625,611 B1 * | 9/2003 | Teig et al. | .............. | 707/102 |
| 7,012,604 B1 * | 3/2006 | Christie et al. | .............. | 345/426 |
| 7,439,970 B1 * | 10/2008 | Clarke | .............. | 345/419 |
| 2001/0013867 A1 * | 8/2001 | Watanabe et al. | .............. | 345/427 |

(Continued)

*Primary Examiner* — Xiao M. Wu
*Assistant Examiner* — David T Welch
(74) *Attorney, Agent, or Firm* — Staas & Halsey LLP (57) ABSTRACT

A method and apparatus for processing a query required for 3-dimensional (3D) display, for example, a visibility query and a localization query, are provided. The method includes: dividing a 3D space into a plurality of regions; and processing a query in units of divided regions, detecting desired divided regions for processing the query of all the divided regions, and outputting objects included in the detected divided regions, as the result of processing the query. According to the method and apparatus, an entire 3D space is divided into a plurality of regions, and when a query required for 3D display or for running a game using 3D display is processed, a query is made to be processed in units of divided regions, and thus the amount of calculation and time required for processing the query can be reduced. Accordingly, performance of 3D display or the performance of a game using 3D display can be improved.

34 Claims, 5 Drawing Sheets

U.S. PATENT DOCUMENTS

| | | | |
|---|---|---|---|
| 2002/0103429 A1* | 8/2002 | deCharms | 600/410 |
| 2002/0163515 A1* | 11/2002 | Sowizral et al. | 345/419 |
| 2004/0125103 A1* | 7/2004 | Kaufman et al. | 345/419 |
| 2005/0244036 A1* | 11/2005 | Rusinek et al. | 382/120 |
| 2006/0066607 A1* | 3/2006 | Schmittler et al. | 345/419 |
| 2006/0139349 A1* | 6/2006 | Reshetov et al. | 345/426 |
| 2007/0024615 A1* | 2/2007 | Keller et al. | 345/421 |
| 2008/0317308 A1* | 12/2008 | Wu et al. | 382/128 |

* cited by examiner

METHOD AND APPARATUS FOR EFFICIENTLY HANDLING QUERY FOR 3D DISPLAY

CROSS-REFERENCE TO RELATED APPLICATIONS

This application claims the benefit of U.S. Provisional Patent Application No. 60/719,561, filed on Sep. 23, 2005, in the U.S. Patent and Trademark Office, and Korean Patent Application No. 10-2006-0003560, filed on Jan. 12, 2006, in the Korean Intellectual Property Office, the disclosures of which are incorporated herein in their entirety by reference.

BACKGROUND OF THE INVENTION

1. Field of the Invention

The present invention relates to 3-dimensional (3D) display, and more particularly, to a method and apparatus for efficiently processing a query required for 3D display or for running a game using 3D display.

2. Description of the Related Art

With the development of 3D display technologies, 3D display technologies have been applied to computer games and thus games employing 3D graphics (3D games) have become widely used. In the case of a 3D game, a large number of objects having motions in a large 3D space exist where each object may have a characteristic motion.

Such a 3D space is formed with a plurality of objects, and the objects can be broken down into geometric objects (ClumpObject), lights (LightObject) that light the 3D space, and cameras (CameraObject).

In order to display such a 3D space or to run the 3D games, queries are required to be processed. Queries that are required to be processed include a visibility query and a localization query. The visibility query is used to obtain information on objects that can be seen from a current camera viewpoint, and the localization query is used to obtain information on surrounding objects of interest from a current arbitrary position.

A great amount of computation power is required to process the queries in a large-scale 3D game or an ordinary 3D application formed in a 3D space including many objects. A general method of processing a visibility query is as follows.

A view frustum, which is a region seen by a current camera, is obtained. Visibility checking is performed in relation to each object existing in the corresponding 3D space to confirm whether or not the object exists in the view frustum. According to the result of the visibility checking, a list of objects that are determined to be in the view frustum is output.

Accordingly, if the number of objects existing in the 3D space is 100,000, for example, the visibility checking should be performed 100,000 times in order to process a visibility query for every object. Also, in the case of localization query processing, distance checking should be performed in which a distance to each and every object existing in the 3D space should be calculated. Accordingly, the distance checking should be performed the same number of times as the number of the objects. Thus, there has been a problem in that a huge amount of computation power is required in order to process queries for 3D display or for running a game using 3D display.

SUMMARY OF THE INVENTION

Additional aspects and/or advantages of the invention will be set forth in part in the description which follows and, in part, will be apparent from the description, or may be learned by practice of the invention.

The present invention provides a method and apparatus for efficiently processing queries, capable of reducing the amount of computation required for processing queries when queries required for 3D display or for running a game using 3D display are processed.

According to an aspect of the present invention, there is provided a method of efficiently processing a query for 3-dimensional (3D) display, the method including: dividing a 3D space into a plurality of regions; and processing a query in units of divided regions, detecting desired regions from the divided regions, and outputting objects included in the detected divided regions, as the result of processing the query.

A directional light which is included in the entire 3D space (Light Object of the 3D space) is detected and is output as a result of processing the query, regardless of a position corresponding to the query. A point light and a spot light can be included in any of the divided regions.

The detecting of the desired divided regions may include: obtaining a view frustum that corresponds to a region visible to a camera in the 3D space; and detecting divided regions that are at least partly included in the view frustum.

In the detecting of the divided regions, divided regions positioned in the vicinity of a specified position of all the regions may be detected.

In the dividing of the 3D space, the 3D space may be divided into voxels of identical size.

The outputting as the result of processing the query may include: detecting divided regions each including a specified object, by using information that each object has; and detecting objects included in the detected divided regions, by using information that each region has.

If an object in the 3D space moves, the method may further include updating the table with respect to changes in the position of the object in relation to the previous position of the object.

According to another aspect of the present invention, there is provided an apparatus for efficiently processing a query for 3D display, the apparatus including: a region division unit dividing a 3D space into a plurality of regions; and a query processing unit processing a query in units of divided regions, detecting desired divided regions for processing the query of all the divided regions, and outputting objects included in the detected divided regions as the result of processing the query.

The apparatus may further include a view frustum detection unit obtaining a view frustum that is a region visible to a camera in the 3D space, wherein the query processing unit detects divided regions that are at least partly included in the view frustum.

The query processing unit may detect divided regions visible to the camera of all the divided regions by using an axis aligned bounding box (AABB) of the view frustum or by applying an edge walking method to the view frustum.

The query processing unit may detect divided regions positioned in the vicinity of a specified position of all the divided regions. The region division unit divides the 3D space into voxels of identical size.

The query processing unit may detect objects included in a divided region where a camera is positioned, of all the divided regions, and detect objects included in a divided region linked to the divided region where the camera is positioned, and through the camera positioned in any one of the two regions linked to each other, objects included in the other divided region are visible.

The query processing unit may detect objects included in each of the divided regions by using a table having information on objects visible to a camera positioned in the divided region.

According to still another aspect of the present invention, there is provided a computer-readable recording medium having embodied thereon a computer program for causing a computer to execute the method of efficiently processing queries for 3D display.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

A method and apparatus for efficiently processing queries for 3-dimensional (3D) display according to embodiments of the present invention will now be described more fully with reference to the accompanying drawings, in which exemplary embodiments of the invention are shown.

Figure 1:
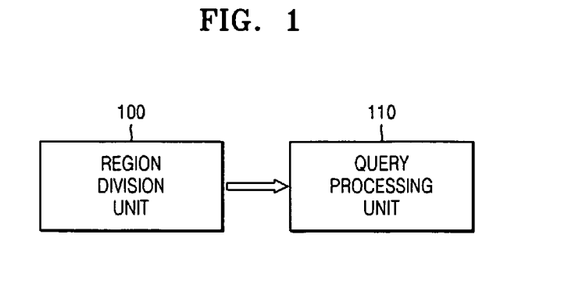
FIG. 1 is a block diagram illustrating a structure of an apparatus for efficiently processing a query for 3D display according to an embodiment of the present invention.

FIG. 1 is a block diagram illustrating a structure of an apparatus for efficiently processing a query for 3D display according to an embodiment of the present invention. The apparatus is composed of a region division unit 100 and a query processing unit 110. The operation of the apparatus for efficiently processing queries illustrated in FIG. 1 will now be explained with reference to a flowchart of FIG. 6 illustrating a method of efficiently processing a query for 3D display according to an embodiment of the present invention.

Figure 6:
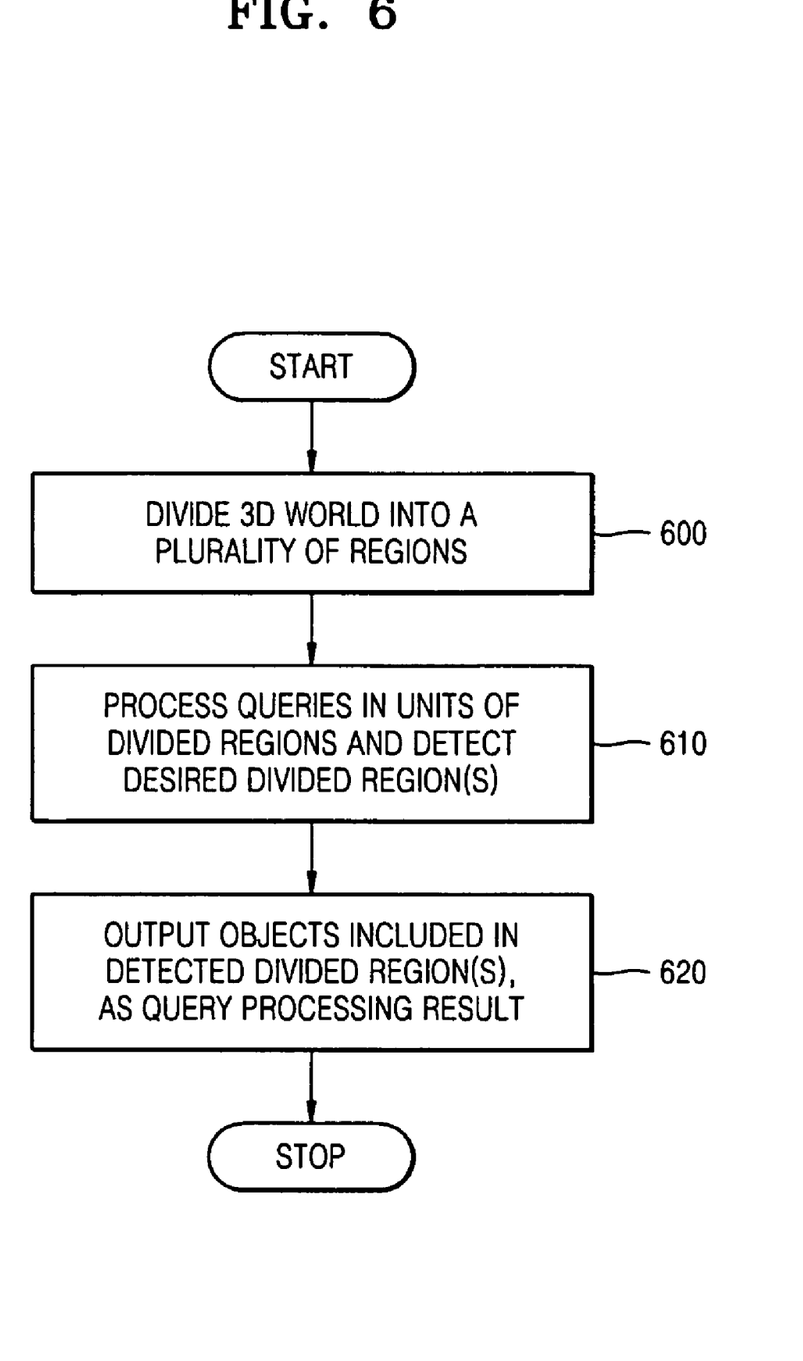
FIG. 6 is a flowchart illustrating a method of efficiently processing a query for 3D display according to an embodiment of the present invention.

Referring to FIG. 6, the region division unit 100 divides an entire 3D space into a plurality of regions in operation 600. The query processing unit 110 processes a query in relation to each of the divided regions and detects regions relevant to the query in operation 610.

The 3D space includes the divided regions. Each region may include objects and the objects may be referred to using pointers.

Queries that are required to be processed when a 3D modeled image is displayed include a visibility query and a localization query. In the case of the visibility query, the query processing unit 110 detects through visibility checking regions that can be seen from a current camera viewpoint of the regions. In the case of the localization query, the query processing unit detects through distance checking surrounding regions of interest from a specified arbitrary position.

The query processing unit 110 detects objects included in the detected regions and outputs a list of the objects as the result of the query processing in operation 620.

Hereinafter, referring to FIGS. 2 through 5, a method and apparatus for efficiently processing queries for 3D display according to the current embodiment of the present invention will be explained in more detail.

Light objects (LightObject) (called "lights" in the background) are classified into directional lights having only directivity and no point sources, and point lights and spot lights that have point sources. The directional lights are similar to solar light, and affect all objects. Accordingly, the directional lights are not included in any one of the regions but are included in the entire 3D space. The point lights and spot lights affect only objects within a predetermined distance and thus are only included in at least any one of the regions.

Through the localization query, information on lights affecting an arbitrary object can be obtained. In an embodiment of the method of processing the localization query, the query processing unit 110 detects all directional lights included in the 3D space, and detects point lights and spot lights included in the regions which affect the arbitrary object. In this way, the query processing unit 110 can detect information on light objects that affect the arbitrary object.

Figure 2:
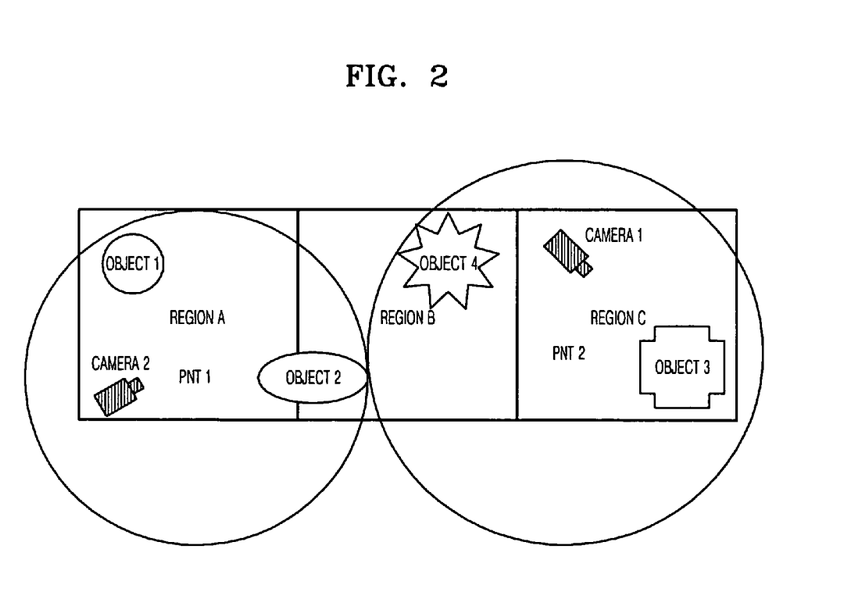
FIG. 2 is a diagram illustrating a method of managing lights among 3D objects according to an embodiment of the present invention.

FIG. 2 is a diagram illustrating a method of managing light objects in a 3D space according to an embodiment of the present invention. FIG. 2 shows a case where a 3D space is divided into three regions. An embodiment of a method of expressing a structure of the 3D space illustrated in FIG. 2 is as follows:

```
World
{
   WorldSectors [sector A, sector B, sector C]
   Lights [dir]
}
WorldSector "sector A"
{
   WorldObjects [obj 1, obj 2, Camera 2]
   Lights [pnt1]
}
WorldSector "sector B"
{
   WorldObjects [obj 2, obj 4]
   Lights [pnt1, pnt2]
}
WorldSector "sector C"
{
   WorldObjects [obj 3, Camera 1]
   Lights [pnt1, pnt2]
}
```

In a method of performing the localization query in order to obtain information on light objects affecting object 2, as illustrated in FIG. 2, for example, the query processing unit 110 detects 'dir' that is a directional light included in the 3D space, detects regions A and B that are regions to which object 2 belongs, and then detects pnt1 and pnt2 that are point light sources because pnt1 and pnt2 both affect the regions to which object 2 belongs. In this way, the query processing unit 110 outputs 'dir', pnt1 and pnt2 as the result of processing the entire localization query.

Figure 3A:
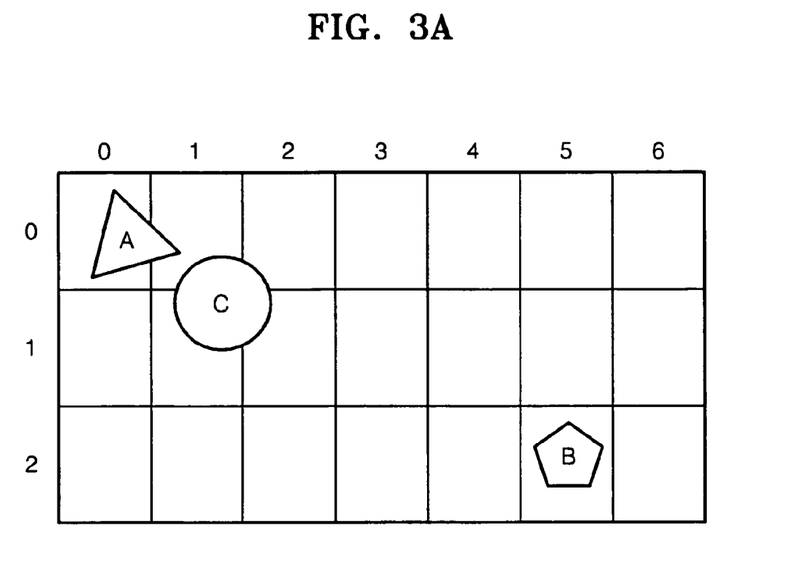
FIG. 3A is a diagram illustrating a method of dividing a 3D space into a plurality of voxels according to an embodiment of the present invention.

FIG. 3A is a diagram illustrating a method of dividing a 3D space into a plurality of voxels according to an embodiment of the present invention. FIG. 3A shows a case where the region division unit 100 divides a 3D space into voxels of an identical size. Each of the divided voxels has indexes in the X-axis direction and in the Y-axis direction, for example (0,1). In the 3D space, 3 objects, A, B, and C, exist.

An equation to determine in which voxels of the plurality of voxels in the 3D space an object exists is expressed as the following equation 1:

$$I_x = \left\lfloor \frac{X - X_{\min}}{S_x} \right\rfloor, I_y = \left\lfloor \frac{Y - Y_{\min}}{S_y} \right\rfloor \quad (1)$$

where $I_x$ and $I_y$ are indexes of a voxel, $S_x$ and $S_y$ are sizes of the voxel, X and Y are positions of the object, $X_{min}$ and $Y_{min}$ are positions of the origin point of a bounding box of the 3D space, and the $\lfloor \ \rfloor$ is a lowering operator.

After a bounding box in relation to an object existing in the 3D space is formed, assuming the positions of corners of the bounding box to be (X,Y), equation 1 is calculated. Then, the voxels to which the object belongs can be determined.

Figure 3B:
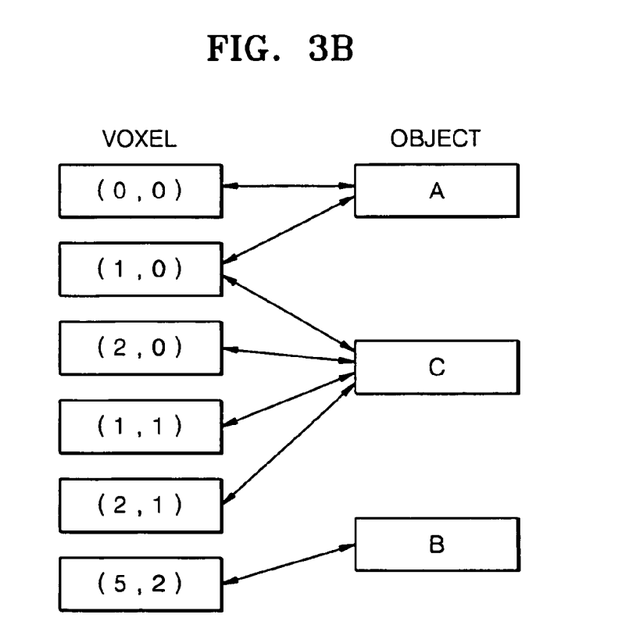
FIG. 3B is a diagram illustrating relations between voxels illustrated in FIG. 3A and objects according to an embodiment of the present invention.

FIG. 3B is a diagram illustrating relationships between voxels and objects illustrated in FIG. 3A according to an embodiment of the present invention. Each of the voxels and objects may have information on the correlations as illustrated in FIG. 3B. That is, each voxel has information on objects that belong to the voxel and each object may have information on voxels to which the object belongs.

As illustrated in FIG. 3B, voxel (0,0) includes object A, voxel (1,0) includes objects A and C, voxel (2,0) includes object C, voxel (1,1) includes object C, voxel (2,1) includes object C, voxel (5,2) includes object B, and the remaining voxels do not include any objects.

Inversely, object A belongs to voxels (0,0) and (1,0), object C belongs to voxels (1,0), (2,0), (1,1), and (2,1), and object B belongs to voxel (5,2).

A localization query to output information on objects in the vicinity of a specific object may be processed based on the correlations between voxels and objects as illustrated in FIG. 3B. That is, the query processing unit 110 detects voxels to which the specific object belongs, from correlation information that each object has, and detects objects included in the detected voxels, from the correlation information that each of the detected voxels has.

For example, when a localization query in relation to object A from the objects illustrated in FIG. 3A is desired to be processed, first, the query processing unit 110 detects voxels (0,0) and (1,0) that include object A, by using correlation information that object A has. Then, the query processing unit 110 outputs objects A and C that are included in the two voxels (0,0) and (1,0), as the result of the localization query, by using correlation information that voxels (0,0) and (1,0) have.

Figure 4A:
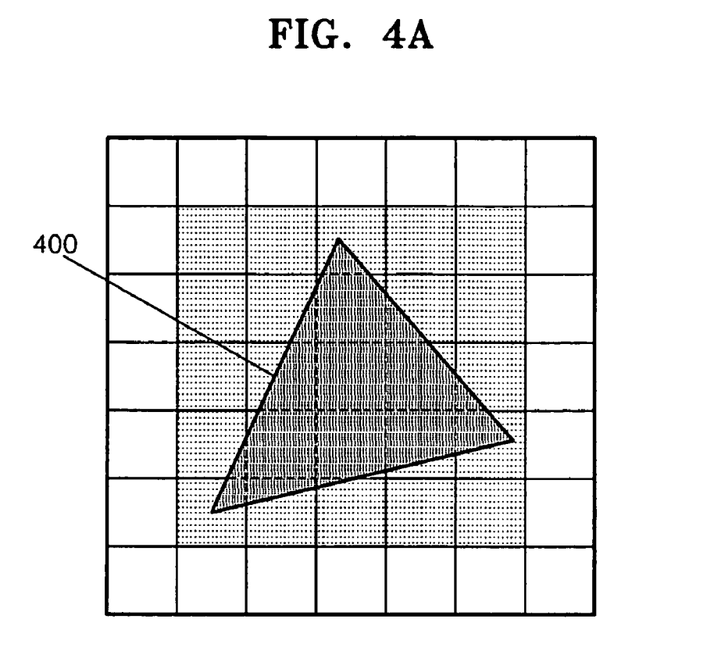
FIGS. 4A and 4B are diagrams illustrating a method of processing a visibility query by using divided voxels according to an embodiment of the present invention.

FIG. 4A illustrates a method of processing a visibility query by using divided voxels according to an embodiment of the present invention. Referring to FIG. 4A, according to the method of processing a visibility query, the voxels in a view frustum 400 are detected from the divided voxels, by using an axis aligned bounding box (AABB) of the view frustum 400 that is an area seen by a camera. That is, a bounding box of the view frustum 400 is formed so that the bounding box has sides parallel with the length axis and the width axis, respectively, of the 3D space, and then, voxels included in the formed bounding box are detected. The current embodiment of the method of processing the visibility query using voxels has an advantage in that the amount of computation required is very small.

Figure 4B:
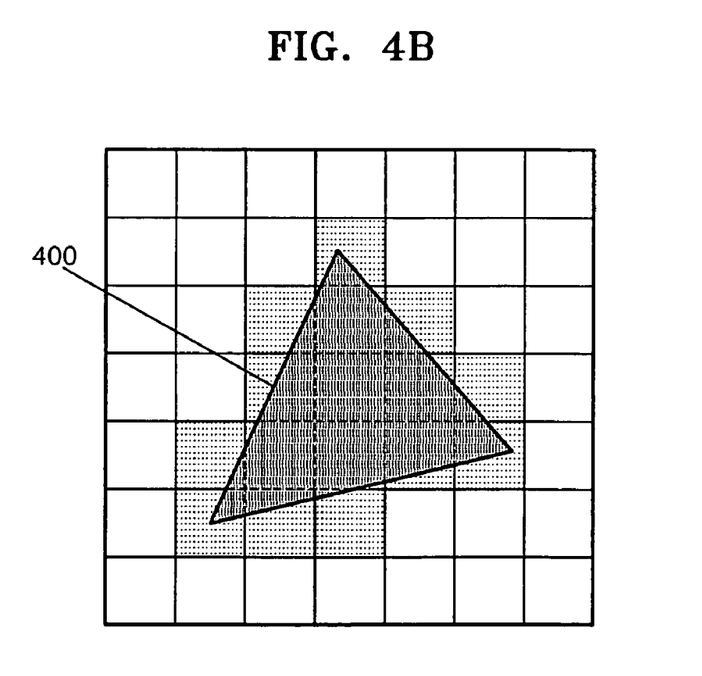

FIG. 4B illustrates a method of processing a visibility query by using divided voxels according to another embodiment of the present invention. Referring to FIG. 4B, an edge walking method is used in relation to a view frustum 400 that is an area seen by a camera so that voxels included in the view frustum 400 are detected from the divided voxels.

In the edge walking method, while tracking edges of a triangle in order to draw a triangle on a 2-dimensional (2D) screen, the start position and the end position of pixels on the horizontal line are obtained. Here, a view frustum of the camera is a triangle and an entire region formed with voxels is a 2D screen. That is, as illustrated in FIG. 4B, edges of the view frustum of the camera are calculated and voxels having any part existing inside the triangle are detected.

As described above, the method of processing queries using divided voxels on the 2D planes is shown, but the method can be identically applied to a 3D space by using voxels each having an index of (x,y,z).

The current embodiment of the method of processing a visibility query by using voxels has an advantage in that the voxels in the view frustum 400 can be more accurately detected than in the previous embodiment.

Figure 5:
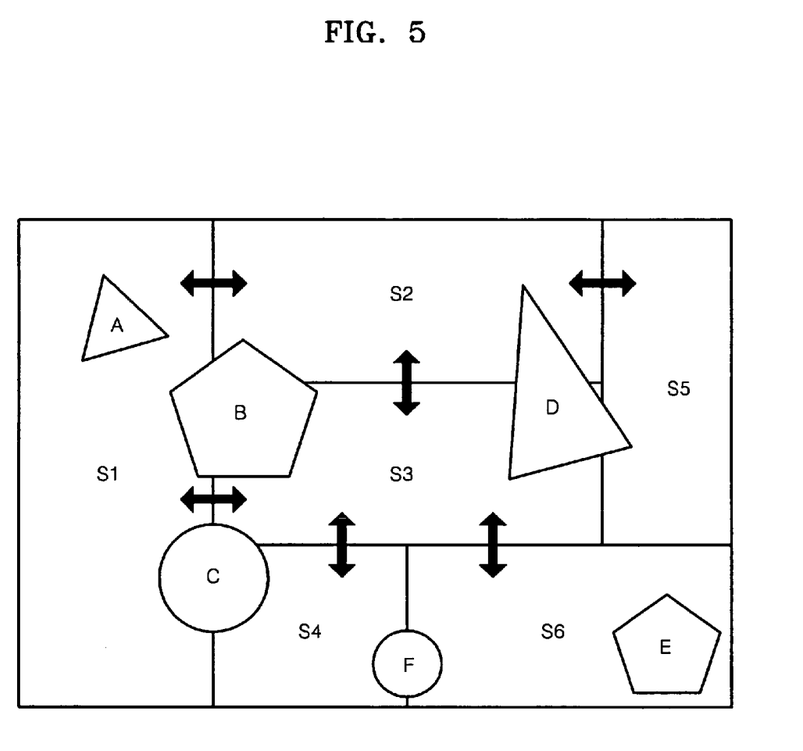
FIG. 5 is a diagram illustrating a method of dividing a 3D space into a plurality of potentially visible set (PVS) sets according to an embodiment of the present invention.

FIG. 5 is a diagram illustrating a method of dividing a 3D space into a plurality of potentially visible sets (PVS) according to an embodiment of the present invention. Referring to FIG. 5, shown is a 3D space divided into a plurality of PVS regions. For convenience of explanation, each of the PVS regions is shown as a rectangular shape not overlapping each other. However, in general, the PVS may have a convex polygon shape and may overlap other PVSs.

Referring to FIG. 5, visibility links, indicated by arrows, show PVS regions that are visibly linked to each other, and through a camera positioned in one of the two PVS regions linked to each other, an object positioned in the other PVS region may be seen. For example, regions S1 and S2 are regions linked to each other indicated by an arrow, and through a camera positioned in region S1 an object existing at region S2 may be seen.

A method of detecting objects seen through the current camera, by processing a visibility query in units of the divided PVS regions will now be explained. The query processing unit 110 detects a PVS region including a position where the current camera is disposed, and detects all objects seen in the detected PVS region. As a result of processing the visibility query, a list of detected objects is output.

Visibility relations between PVS regions illustrated in FIG. 5 are shown in the following table 1:

| visible | S1 | S2 | S3 | S4 | S5 | S6 |
|---|---|---|---|---|---|---|
| S1 |  | yes | yes |  |  |  |
| S2 | yes |  | yes |  | yes |  |
| S3 | yes | yes |  | yes |  | yes |
| S4 |  |  | yes |  |  |  |
| S5 |  | yes |  |  |  |  |
| S6 |  |  | yes |  |  |  |

As illustrated in table 1, region S1 is visible from regions S2 and S3, region S2 is visible from regions S1, S3 and S5, and region S3 is visible from regions S1, S2, S4 and S6. The visibility relations between PVS regions as illustrated above may be determined arbitrarily by a developer of 3D display or a 3D game, or may be automatically generated using a visibility test algorithm.

The relations between the PVS regions illustrated in FIG. 5 and objects existing in the 3D space are shown in the following table 2 which shows objects visible from each PVS region:

The correlations between PVS sectors and objects are shown in the following exemplary table 2:

| visible | S1 | S2 | S3 | S4 | S5 | S6 |
|---------|-----|-----|-----|-----|-----|-----|
| A | yes | yes | yes | | | |
| B | yes | | yes | | | |
| C | yes | | yes | yes | | |
| D | yes | | | yes | | yes |
| E | | | | | yes | yes |
| F | | | | yes | | yes |

As illustrated in table 2, objects A, B, C, and D are visible from region S1, object A is visible from region S2, and objects A, B, and C are visible from region S3. Objects C, D, and F are visible from region S4, object E is visible from region S5, and objects D, E, and F are visible from region S6.

Setting of the objects visible from each divided PVS region, as described above, may be determined by a developer of 3D display or a 3D game.

A method of processing a visibility query according to an embodiment of the present invention will now be explained. An example of detecting objects visible to a camera when the camera is disposed in region S2 among the PVS regions will be provided, but the method is not limited to this example.

The query processing unit 110 detects object A as an object visible from region S2 where the camera is disposed. The query processing unit 110 detects regions S1, S3 and S5, as regions linked to region S2. Also, as objects visible from the linked regions S1, S3 and S5, the query processing unit 110 detects objects A, B, C and D as objects seen from region S1, objects A, B, and C as objects seen from region S3, and object E as an object seen from region S5. The query processing unit 110 outputs objects A, B, C, D, and E that are the sum of the detected objects, as the result of the visibility query.

The query processing unit 110 may detect objects visible from a predetermined PVS region, by referring to a table indicating the relationship between visibility of objects from PVS regions as in table 2, for example. Also, the query processing unit 110 may detect PVS regions linked to a predetermined PVS region, by referring to a table indicating the linking relationship between PVS regions as in table 1, for example.

When an object dynamically moving in a 3D space exists, a table indicating the relations between PVS regions and objects, such as table 2, for example, may be updated with respect to the motion in relation to the moving object. Accordingly, the apparatus for processing queries according to the embodiment of the present invention may further include a table update unit (not shown) for updating a table indicating the relations between the PVS regions and objects.

A method used by the table update unit of updating a table indicating the relations between the PVS regions and objects when the moving object moves continuously, according to an embodiment of the present invention will now be explained.

The table update unit confirms whether or not the moving object is included in the previous PVS regions that appear to include the moving object in the current table. If the confirmation result indicates that the object is still included in the previous regions, the table update unit does not update the table.

If the confirmation result indicates that the moving object is not included in the previous PVS regions, the table update unit detects PVS regions linked to the previous PVS regions, by using a table indicating the linkage relations between PVS regions as in table 1. In relation to each linked PVS region, the table update unit confirms whether the moving object is included in the PVS region, and the table update unit updates the table indicating the relations between the PVS regions and objects according to the confirmation result.

For example, when object E illustrated in FIG. 5 moves gradually to region S2, the table update unit confirms that object E is not included in the previous regions, S5 and S6, and by checking regions S2 and S3 that are linked to regions S5 and S6, respectively, confirms that object E is included in region S2. Then, the table update unit updates table 2 as the following table 3:

| visible | S1 | S2 | S3 | S4 | S5 | S6 |
|---------|-----|-----|-----|-----|-----|-----|
| A | yes | yes | yes | | | |
| B | Yes | | yes | | | |
| C | yes | | yes | yes | | |
| D | yes | | | yes | | yes |
| E | | yes | | | | |
| F | | | | Yes | | yes |

A method used by the table update unit of updating a table indicating the relations between the PVS regions and objects when the moving object moves discontinuously, according to an embodiment of the present invention, will be explained below.

The table update unit confirms whether or not the moving object is included in the previous PVS regions that appear to include the moving object in the current table. If the confirmation result indicates that the moving object is still included in the previous regions, the table update unit does not update the table.

If the confirmation result indicates that the moving object is not included in the previous PVS regions, the table update unit confirms, for each PVS region, whether the moving object is included in the PVS region. Then, according to the confirmation result, the table update unit updates the table indicating the relations between the PVS regions and objects.

For example, when object E illustrated in FIG. 5 moves instantaneously to region S1, the table update unit confirms that object E is not included in the previous regions, S5 and S6, and by checking all PVS regions, confirms that object E is included in region S1. Then, the table update unit updates table 2 as the following table 4:

| visible | S1 | S2 | S3 | S4 | S5 | S6 |
|---------|-----|-----|-----|-----|-----|-----|
| A | yes | yes | yes | | | |
| B | yes | | yes | | | |
| C | yes | | yes | yes | | |
| D | yes | | | yes | | yes |
| E | yes | | | | | |
| F | | | | yes | | yes |

The apparatus for processing queries for 3D display according to the current embodiment of the present invention may use the method of processing queries using the PVS regions, in order to process a visibility query, and use the method of processing queries using voxels, in order to process a localization query.

A method of defining a 3D space in class form according to an embodiment of the present invention is as follow:

```
class World
{
private:
    virtual void addObject(Object &obj) = 0;
    virtual void removeObject(Object &obj) = 0;
    virtual void addLight (Object &obj);
    virtual void removeLight(Object &obj);
    virtual void moveObject(Object &obj) = 0;
    virtual void teleportObject(Object &obj) = 0;
}
```

A method of defining a 3D space, which is divided into a plurality of voxels, in class form according to an embodiment of the present invention is as follows:

```
class VoxelWorld : public World
{
public:
    virtual void addObject(Object &obj);
    virtual void removeObject(Object &obj);
    virtual void moveObject(Object &obj);
    virtual void teleportObject(Object &obj);
}
```

Here, addObject( ) is a function which obtains the position (P) of a predetermined object, detects voxels (V) including the predetermined object from the divided voxels, and links the detected voxels (V) and the predetermined object. removeObject( ) is a function which removes the link between a voxel (V) and the predetermined object.

moveObject( ) is a function which, if motion of a predetermined object exists, obtains voxels (V) linked to the predetermined object, obtains a current position (PN) of the predetermined object, then detects current voxels (CV) including the predetermined object with respect to the current position (PN) of the predetermined object, removes the link between the voxels (V) and the predetermined object, and then links the detected current voxels (CV) and the predetermined object. Also, teleportObject( ) is a function identical to moveObject( ).

A method of defining a 3D space, which is divided into a plurality of PVS regions, in class form of class according to an embodiment of the present invention is as follows:

```
class PvsWorld : public VoxelWorld
{
public:
    virtual void addObject(Object &obj);
    virtual void removeObject(Object &obj);
    virtual void moveObject(Object &obj);
    virtual void teleportObject(Object &obj);
}
```

Here, addObject( ) is a function which obtains the position (P) of a predetermined object, detects PVS regions (S) including the predetermined object among the divided PVS regions by checking all divided PVS regions, and links the detected PVS regions (S) and the predetermined object. removeObject( ) is a function which removes the link between a PVS region (S) and the predetermined object.

moveObject( ) is a function which, if motion of a predetermined object exists, links PVS regions, currently including the predetermined object, to the predetermined object. Also, teleportObject( ) is a function which, if the predetermined object moves instantaneously to another point, links PVS regions, currently including the predetermined object, to the predetermined object.

More specifically, moveObject( ) is a function which obtains PVS regions (S) linked to the predetermined object, obtains a current position (PN) of the predetermined object, confirms PVS regions (SL) including the predetermined object of PVS regions linked to the PVS regions (S), and then links the confirmed current PVS regions (SL) and the predetermined region.

teleportObject( ) is a function which obtains PVS regions (S) linked to the predetermined object, obtains a current position (PN) of the predetermined object, then confirms current PVS regions (SL) including the predetermined region of all PVS regions of the 3D space, removes links between the PVS regions (S) and the predetermined object, and then links the confirmed current PVS regions (SL) and the predetermined object.

The present invention can also be embodied as computer-readable codes on a computer-readable recording medium executable by a computer. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the method and apparatus for efficiently processing queries for 3D display as described above, when a query required for 3D display or for running a game using 3D display is processed, an entire 3D space is divided into a plurality of regions and the query is processed in units of the regions. In this manner, the amount of computation and time required for processing the query can be reduced and thus the performance of the 3D display or the game using the 3D display can be improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of efficiently processing a query for 3-dimensional (3D) display, the method comprising:
    dividing a 3D space into a plurality of regions which are at least one of voxels and Potentially Visible Set (PVS) regions;
    selecting a query from among a plurality of queries including a visibility query and a localization query;

processing the visibility query per each of the regions divided into the PVS regions if the visibility query is selected;

processing the localization query per each of the regions divided into the voxels if the localization query is selected; and detecting divided regions satisfied with the selected query using correlations information of objects included in the divided regions, and outputting objects included in the detected divided regions as the result of processing the selected query based on the correlations information of the detected regions, wherein the dividing of the 3D space and the processing of the selected query are performed by a processor, and wherein each of the divided regions has the correlations information on objects included in the region, and each object existing in the 3D space has the correlations information on divided regions in which the object is included.

2. The method of claim 1, wherein a directional light which is included in the 3D space is detected and is output as a result of processing the selected query, regardless of a position corresponding to the selected query.

3. The method of claim 1, wherein a point light and a spot light included in any of the divided regions are light sources that detect objects.

4. The method of claim 1, wherein the detecting of the desired divided regions comprises:

obtaining a view frustum that corresponds to a region visible to a camera in the 3D space; and detecting divided regions that are at least partly included in the view frustum.

5. The method of claim 4, wherein in the detecting of the divided regions, the divided regions visible to the camera of all the divided regions are detected using an axis aligned bounding box of the view frustum.

6. The method of claim 4, wherein, in the detecting of the divided regions, divided regions seen by the camera are detected by applying an edge walking method to the view frustum.

7. The method of claim 1, wherein, in the detecting of the desired divided regions, divided regions positioned in the vicinity of a specified position of all the regions are detected.

8. The method of claim 1, wherein the outputting as the result of processing the selected query comprises:

detecting divided regions each including a specified object, by using information that each object has; and detecting objects included in the detected divided regions, by using information that each region has.

9. The method of claim 1, wherein, in the dividing of the 3D space, the 3D space is divided into voxels of identical size.

10. The method of claim 9, further comprising, for each object existing in the 3D space, obtaining voxels including one of the objects, by using the following equation:

$$I_x = \left\lfloor \frac{X - X_{\min}}{S_x} \right\rfloor, I_y = \left\lfloor \frac{Y - Y_{\min}}{S_y} \right\rfloor$$

where $I_x$ and $I_y$ are indexes of a voxel, $S_x$ and $S_y$ are sizes of the voxel, X and Y are positions of the object, and $X_{min}$ and $Y_{min}$ are positions of the origin point of a 3D space bounding box.

11. The method of claim 1, wherein the outputting as the result of processing the selected query comprises:

detecting objects included in a divided region where a camera is positioned; and detecting objects included in a divided region linked to the divided region where the camera is positioned, wherein, through the camera positioned in any one of the two divided regions linked to each other, objects included in the other divided region are visible.

12. The method of claim 11, wherein each of the divided regions has a convex polygon shape.

13. The method of claim 11, wherein, in the detecting of objects included in the divided region where the camera is positioned, objects included in each of the divided regions are detected using a table having information on objects visible to the camera positioned in the divided region.

14. The method of claim 13, wherein the table is updated with respect to changes in the position of an object in the 3D space if the object in the 3D space moves.

15. The method of claim 14, wherein the updating of the table comprises:

confirming whether the object is included in original regions where the object was positioned before moving, if the object moves gradually to another position in relation to a previous position of the object over time;

confirming whether the object is included in divided regions linked to the original divided regions where the object was positioned before moving if the object is not included in the original regions when the object moves; and updating the table according to the result of the confirmation whether the object is included in divided regions linked to the original divided regions if the object is not included in the original regions.

16. The method of claim 14, wherein the updating of the table comprises:

confirming, for each divided region, whether a divided region includes the object if the object moves instantaneously to another position relative to a previous position of the object; and updating the table according to the result of the confirmation as to whether the divided region includes the object if the object moves instantaneously to another position.

17. An apparatus for efficiently processing a query for 3D display, the apparatus comprising:

a region division unit to divide a 3D space into a plurality of regions which are at least one of voxels and Potentially Visible Set (PVS) regions;

a query processing unit to select a query from among a plurality of queries including a visibility query and a localization query, to process the visibility query per each of the regions divided into the PVS regions if the visibility query is selected, to process the localization query per each of the regions divided into the voxels if the localization query is selected, to detect regions satisfied with the selected query using correlations information of objects included in the divided regions, and to output objects included in the detected divided regions based on the correlations information of the detected regions as the result of processing the query; and a storage unit to store the correlations information on objects included in a divided region for each of the divided regions, and to store the correlations information on divided regions in which an object is included for each of the objects existing in the 3D space.

18. The apparatus of claim 17, wherein a directional light that is included in the 3D space is detected and the query processing unit outputs the directional light as a result of processing the selected query, regardless of a position corresponding to the selected query.

19. The apparatus of claim 17, wherein a point light and a spot light included in any of the divided regions are light sources that detect objects.

20. The apparatus of claim 17, further comprising a view frustum detection unit to obtain a view frustum that is a region visible to a camera in the 3D space,
   wherein the query processing unit detects divided regions that are at least partly included in the view frustum.

21. The apparatus of claim 20, wherein the query processing unit detects divided regions visible to the camera of all the divided regions by using an axis aligned bounding box of the view frustum.

22. The apparatus of claim 20, wherein the query processing unit detects divided regions visible to the camera, by applying an edge walking method to the view frustum.

23. The apparatus of claim 17, wherein the query processing unit detects divided regions positioned in the vicinity of a specified position of all the divided regions.

24. The apparatus of claim 17, wherein the query processing unit detects divided regions including a specified object, and detects other objects which are included in the detected divided regions, by using information stored in the storage unit.

25. The apparatus of claim 17, wherein the region division unit divides the 3D space into voxels of identical size.

26. The apparatus of claim 25, further comprising, for each object existing in the 3D space, a voxel detection unit to obtain voxels including one of the objects, by using the following equation:

$$I_x = \left\lfloor \frac{X - X_{\min}}{S_x} \right\rfloor, I_y = \left\lfloor \frac{Y - Y_{\min}}{S_y} \right\rfloor$$

where $I_x$ and $I_y$ are indexes of a voxel, $S_x$ and $S_y$ are sizes of the voxel, X and Y are positions of the object, and $X_{min}$ and $Y_{min}$ are positions of the origin point of a 3D space bounding box.

27. The apparatus of claim 17, wherein the query processing unit detects objects included in a divided region where the camera is positioned, of all the divided regions and detects objects included in a divided region linked to the divided region where the camera is positioned, and through a camera positioned in any one of the two regions linked to each other, objects included in the other divided region are visible.

28. The apparatus of claim 27, wherein each of the divided regions has a convex polygon shape.

29. The apparatus of claim 27, wherein the query processing unit detects objects included in each of the divided regions by using a table having information on objects visible to the camera positioned in the divided region.

30. The apparatus of claim 29, further comprising a table update unit to update the table with respect to changes in the position of an object in the 3D space if the object in the 3D space moves.

31. The apparatus of claim 30, wherein the table update unit comprises:
   a region confirmation unit to confirm whether the object is included in original divided regions where the object was positioned before moving, if the object moves gradually to another position in relation to a previous position of the object over time, and to confirm whether the object is included in regions linked to the original divided regions if the object is not included in the original divided regions when the object moves; and
   an update unit to update the table according to the result of the confirmation whether the object is included in divided regions linked to the original divided regions if the object is not included in the original region.

32. The apparatus of claim 31, wherein the table update unit comprises:
   a region confirmation unit to confirm for each divided region whether one of the divided regions includes the object if the object moves instantaneously to another position relative to a previous position of the object; and
   an update unit to update the table according to the result of the confirmation as to whether the divided region includes the object if the object moves instantaneously to another position.

33. A non-transitory computer-readable recording medium having embodied thereon a computer program for causing a computer to execute the method of claim 1.

34. A method of efficiently processing a query for 3-dimensional (3D) display, the method comprising:
   dividing a 3D space into a plurality of regions which include at least one of voxels and at least one of Potentially Visible Set (PVS) regions;
   processing a visibility query per each of the regions divided into the PVS regions and processing a localization query per each of the regions divided into the voxels; and
   detecting divided regions satisfied with the visibility query and localization query using correlations information of objects included in the divided regions, and outputting objects included in the detected divided regions as the result of processing the visibility query and processing the localization query based on the correlations information of the detected regions,
   wherein the dividing of the 3D space and the processing of the visibility query and the processing of the localization query are performed by a processor, and
   wherein each of the divided regions has the correlations information on objects included in the region, and each object existing in the 3D space has the correlations information on the divided regions in which the object is included.

* * * * *